(12) United States Patent
Rude

(10) Patent No.: US 9,302,717 B1
(45) Date of Patent: Apr. 5, 2016

(54) TRUCK BED EXTENSION

(71) Applicant: Terry James Rude, Fairview, OR (US)

(72) Inventor: Terry James Rude, Fairview, OR (US)

( * ) Notice: Subject to any disclaimer, the term of this patent is extended or adjusted under 35 U.S.C. 154(b) by 0 days.

(21) Appl. No.: 14/728,794

(22) Filed: Jun. 2, 2015

Related U.S. Application Data

(63) Continuation-in-part of application No. 14/472,031, filed on Aug. 28, 2014, now abandoned.

(60) Provisional application No. 61/871,064, filed on Aug. 28, 2013.

(51) Int. Cl.
*B62D 33/03* (2006.01)
*B62D 33/02* (2006.01)
*B60P 3/40* (2006.01)

(52) U.S. Cl.
CPC ............... *B62D 33/0207* (2013.01); *B60P 3/40* (2013.01)

(58) Field of Classification Search
CPC .......................... B62D 33/0273; B62D 33/03
USPC .............................................. 296/26.11, 57.1
See application file for complete search history.

(56) References Cited

U.S. PATENT DOCUMENTS

| | | | | |
|---|---|---|---|---|
| 2,556,101 A | * | 6/1951 | Negin | B60P 3/423 224/42.13 |
| 5,816,637 A | * | 10/1998 | Adams | B62D 33/0273 296/26.09 |
| 5,902,000 A | * | 5/1999 | Wold | B62D 33/0273 296/26.11 |
| 6,019,410 A | * | 2/2000 | Trostle | B60P 3/40 296/26.11 |
| 6,279,980 B1 | * | 8/2001 | Straschewski | B62D 33/0273 296/26.11 |
| 6,378,926 B1 | | 4/2002 | Renze | |
| 6,764,123 B1 | * | 7/2004 | Bilyard | B60P 1/435 296/61 |
| 7,226,100 B1 | * | 6/2007 | Willey | B62D 33/03 296/26.11 |
| 8,109,552 B2 | | 2/2012 | Nelson | |
| 8,182,012 B1 | * | 5/2012 | Brister | B60P 3/40 296/26.11 |
| D717,229 S | * | 11/2014 | Cook | D12/414 |
| 2014/0175826 A1 | | 6/2014 | Hausler | |

* cited by examiner

*Primary Examiner* — Jason S Morrow
(74) *Attorney, Agent, or Firm* — Plager Schack LLP

(57) ABSTRACT

A truck bed extension is configured to connect to a right striker post and a left striker post on a truck having a tail gate. The truck bed extension has a tail gate attachment plate, mechanically coupled to the tail gate. A back plate is rotationally connected to the tail gate attachment plate with a first back plate hinge assembly, a second back plate hinge assembly, a third back plate hinge assembly and a fourth back plate hinge assembly. Right and left plates are rotationally connected to the back plate with two plate hinge assemblies. A right plate bracket is attached to the right plate and configured to receive the right striker post. A left plate bracket is attached to the left plate and configured to receive the left striker post.

3 Claims, 7 Drawing Sheets

TRUCK BED EXTENSION

RELATED APPLICATION

This application is a continuation-in-part of U.S. Nonprovisional application Ser. No. 14/472,031 that, in turn, claims priority to provisional patent application U.S. Ser. No. 61/871,064 filed on Aug. 28, 2014, the entire contents of both applications is herein incorporated by reference.

BACKGROUND

The embodiments herein relate generally to automotive accessories.

Prior to embodiments of the disclosed invention, truck bed extensions did not have a good theory of how to accommodate the existing striker or latch post. Some endeavors include: U.S. Pat. No. 8,109,552 issued to Nelson; U.S. Pat. No. 6,378,926 issued to Renze; and U.S. Patent Application Publication 2014/0175826 filed by Hausler.

Nelson teaches a truck bed extension system that uses a back member and two sides, but does not teach a bracket and clip to attach to the existing striker post on a truck. Rather, Nelson teaches replacing the striker assembly entirely. Renze uses a rotatable latch key attach the wing to the truck. Hausler uses a hinge assembly for this purpose.

SUMMARY

A truck bed extension is configured to connect to a right striker post and a left striker post on a truck having a tail gate. The truck bed extension has a tail gate attachment plate, mechanically coupled to the tail gate. A back plate is rotationally connected to the tail gate attachment plate with a first back plate hinge assembly, a second back plate hinge assembly, a third back plate hinge assembly and a fourth back plate hinge assembly. Right and left plates are rotationally connected to the back plate with two plate hinge assemblies. A right plate bracket is attached to the right plate and configured to receive the right striker post. A left plate bracket is attached to the left plate and configured to receive the left striker post.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
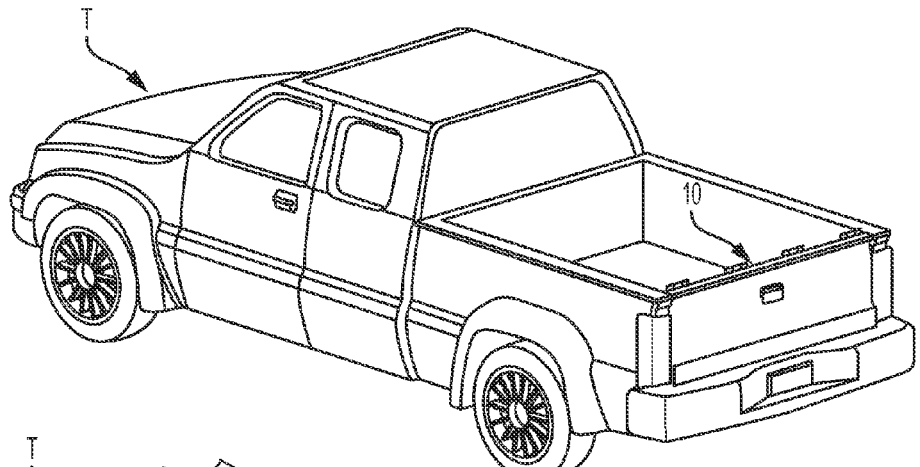
FIG. 1 is a perspective view of an embodiment of the invention shown in use (installed) in non-deployed configuration.
Figure 2:
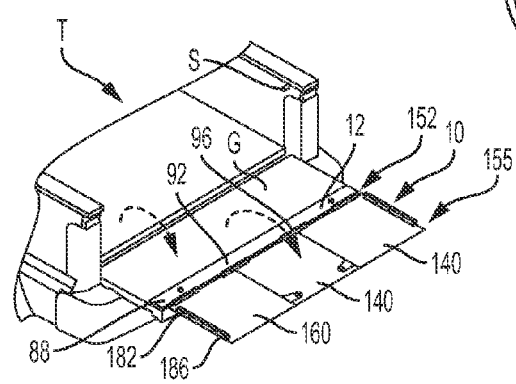
FIG. 2 is a detail perspective view of an embodiment of the invention demonstrated partially deployed.
Figure 3:
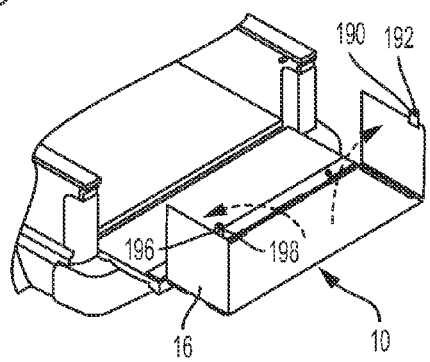
FIG. 3 is a detail perspective view of an embodiment of the invention demonstrated partially deployed.
Figure 4:
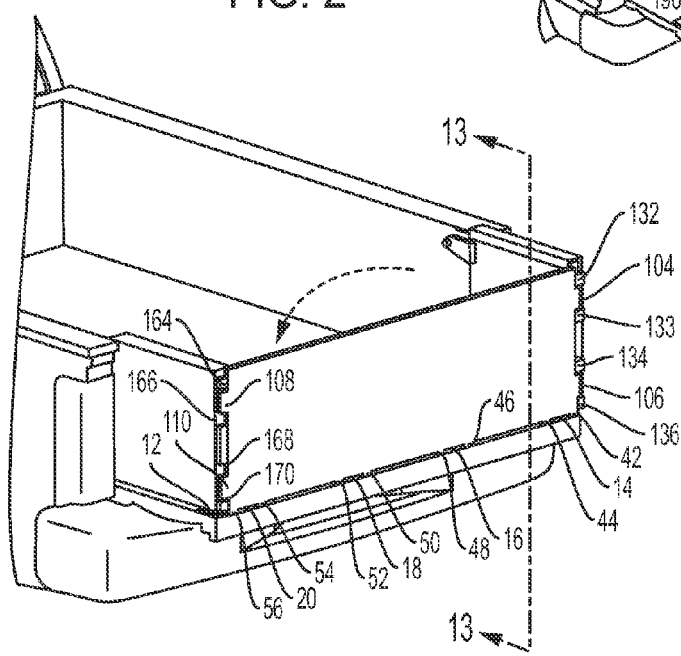
FIG. 4 is a detail perspective view of an embodiment of the invention demonstrated fully deployed but unlocked.
Figure 5:
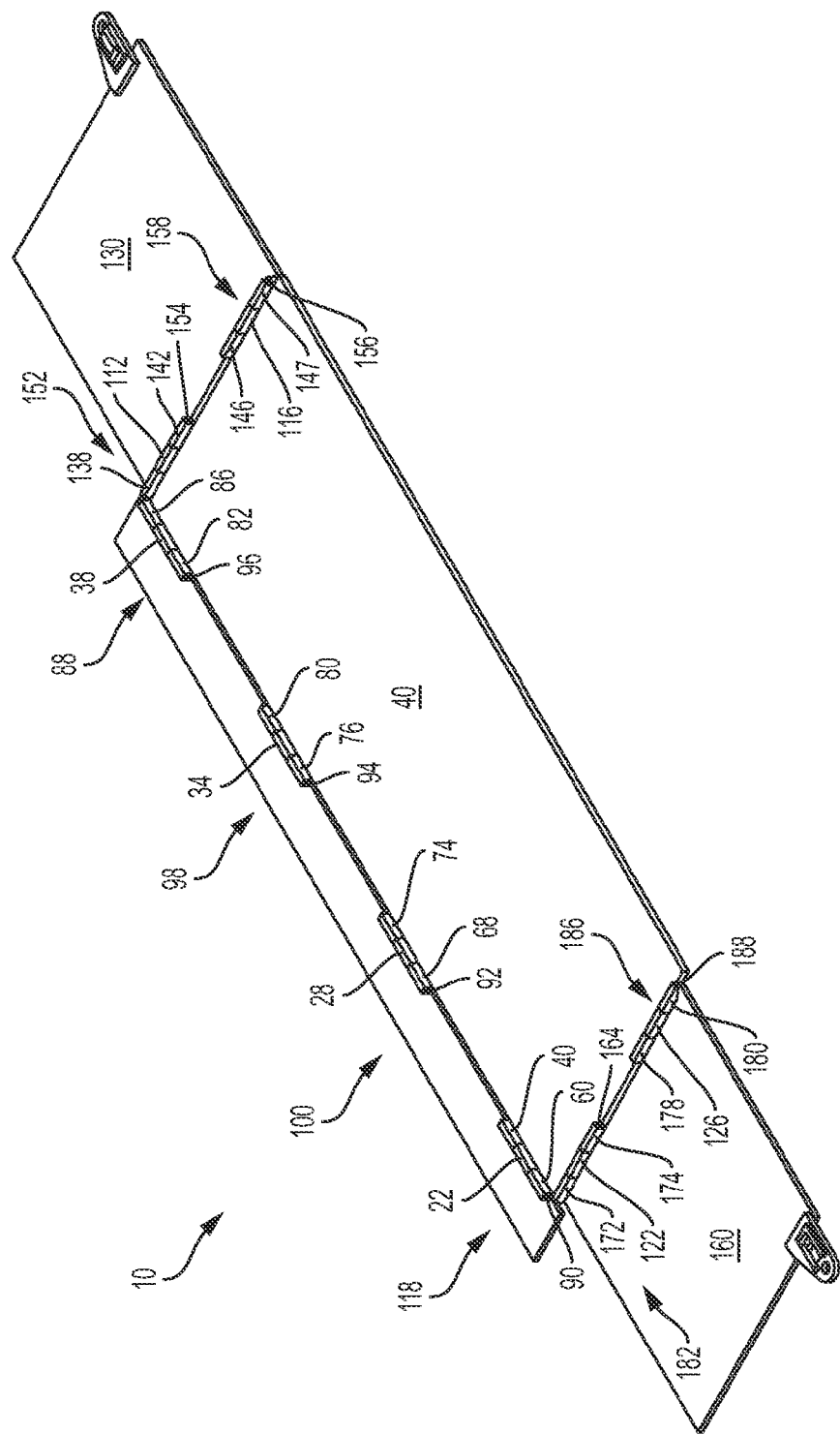
FIG. 5 is a perspective view of an embodiment of the invention demonstrated in flat configuration.
Figure 6:
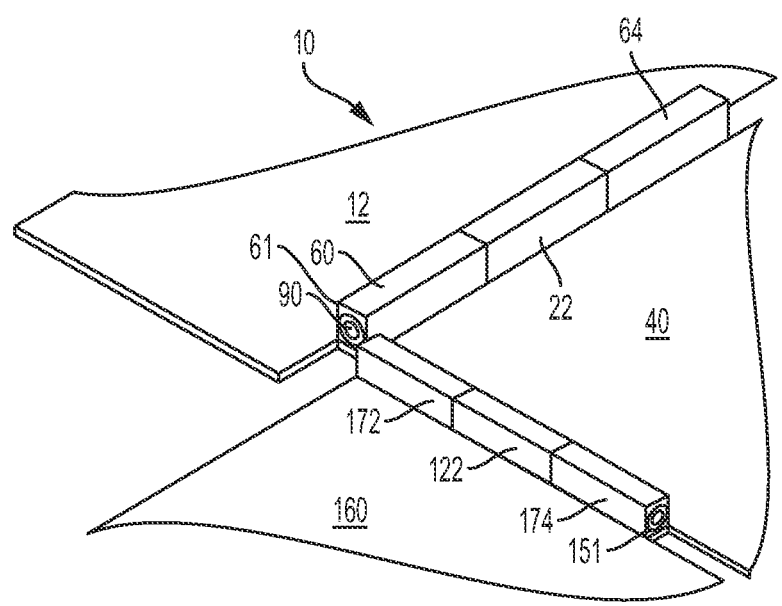
FIG. 6 is a detail perspective view of an embodiment of the invention demonstrated in flat configuration and demonstrating hinge components.
Figure 7:
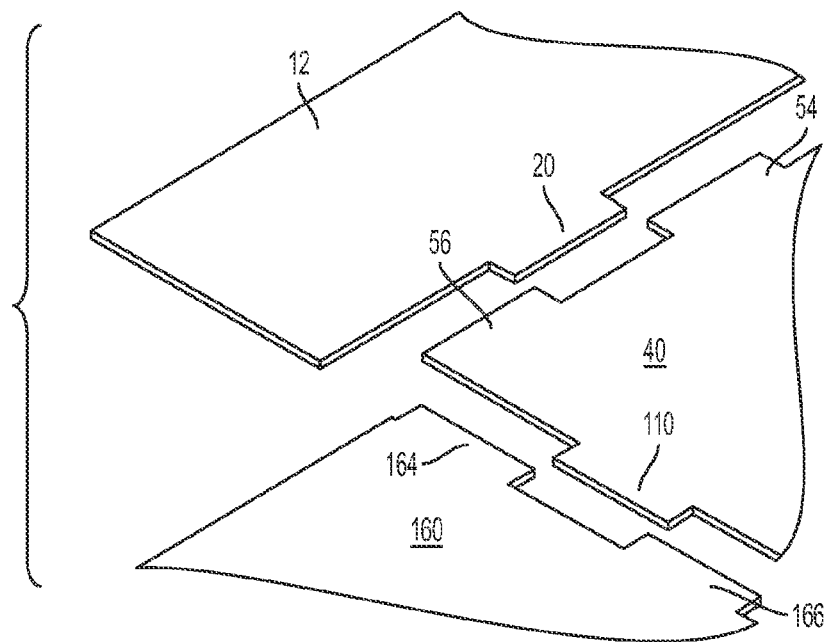
FIG. 7 is a detail perspective view of an embodiment of the invention similar to FIG. 6 but eliminating hinge components for illustrative clarity of plate design.
Figure 8:
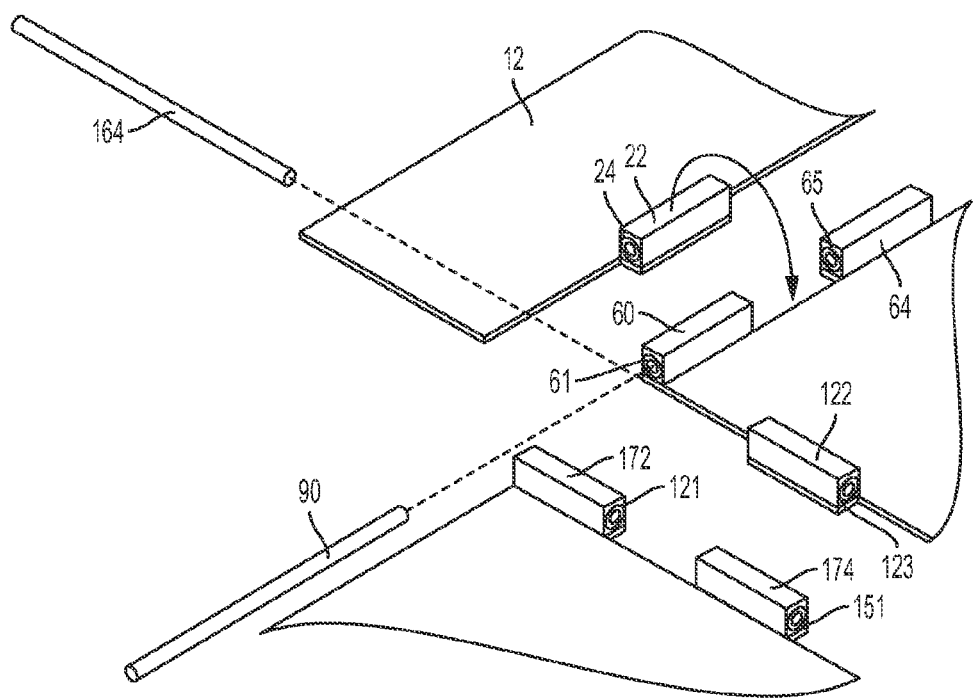
FIG. 8 is a detail exploded view of an embodiment of the invention demonstrating primary component assembly method.
Figure 9:
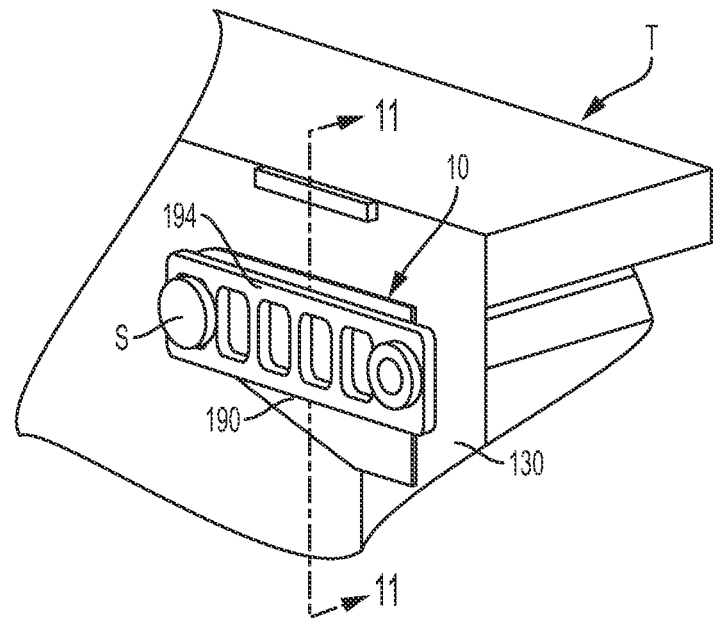
FIG. 9 is a detail exploded view of an embodiment of the invention demonstrated fully deployed.
Figure 10:
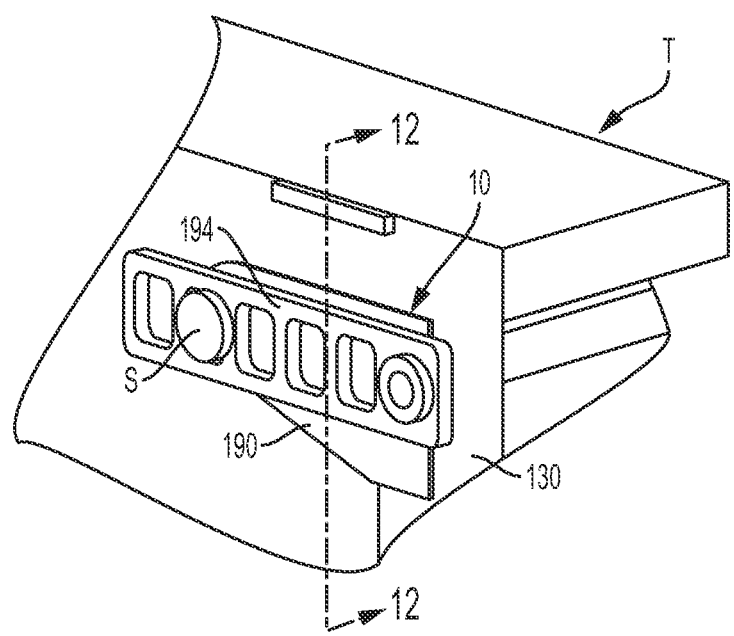
FIG. 10 is a detail exploded view of an embodiment of the invention demonstrated fully deployed and locked.
Figure 11:
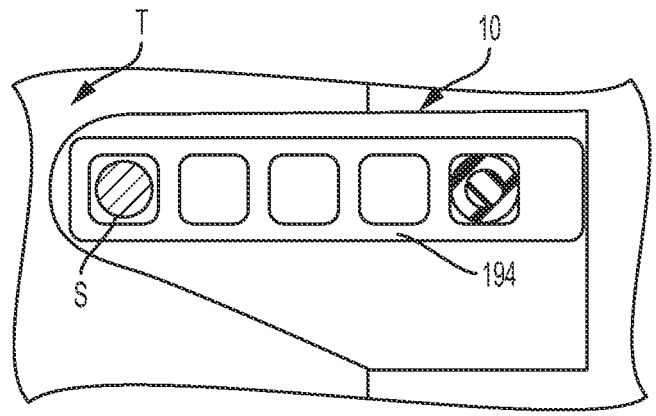
FIG. 11 is a detail perspective view of an embodiment of the invention demonstrating alternate configuration.
Figure 12:
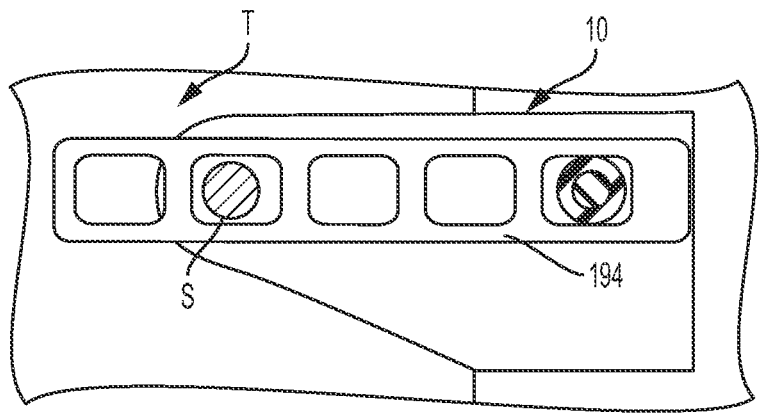
FIG. 12 is a detail perspective view of an embodiment of the invention.
Figure 13:
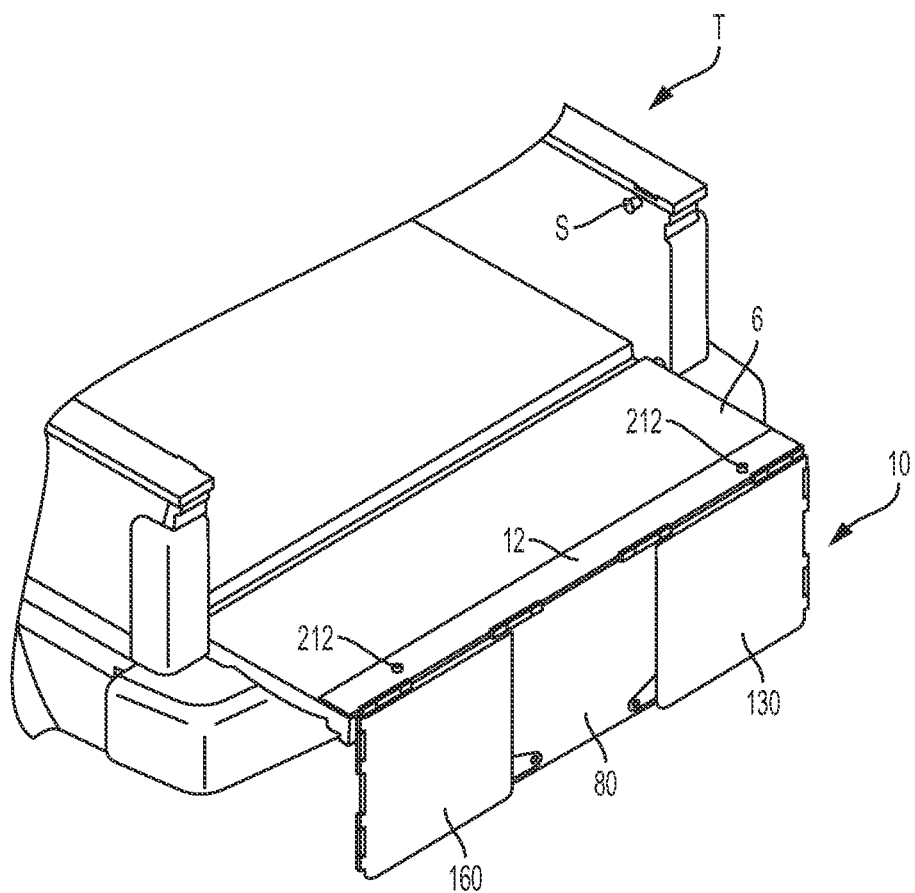
FIG. 13 is a detail perspective view of an embodiment of the invention.

By way of example, and referring to FIGS. 1-14, truck T has tail gate G, right striker post S and left striker post S. A user desires to extend the length of the bed of truck T and truck bed extension 10 accomplishes this. Truck bed extension 10 is mechanically coupled to tail gate G with tail gate attachment plate 12. As shown in FIG. 14, and in some embodiments, this can be done with tail gate attachment plate fasteners 212. Tail gate attachment plate 12 further comprises first tail gate attachment plate extension portion 14, second tail gate attachment plate extension portion 16, third tail gate attachment plate extension portion 18 and fourth tail gate attachment plate extension portion 20.

First tail gate attachment plate extension portion 14 is mechanically coupled to first tail gate attachment plate extension portion tube 22 which is configured to accommodate first tail gate attachment plate extension portion cylinder 24. Second tail gate attachment plate extension portion 16 is mechanically coupled to second tail gate attachment plate extension portion tube 28 which is configured to accommodate a second tail gate attachment plate extension portion cylinder. Third tail gate attachment plate extension portion 18 is mechanically coupled to third tail gate attachment plate extension portion tube 34 which is further mechanically coupled to third tail gate attachment plate extension portion cylinder. Fourth tail gate attachment plate extension portion 20 is mechanically coupled to fourth tail gate attachment plate extension portion tube 38 which is further mechanically coupled to a fourth tail gate attachment plate extension portion cylinder.

Tail gate attachment plate 12 is mechanically coupled to back plate 40. Back plate 40 further comprises first back plate back extension portion 42, second back plate back extension portion 44, third back plate back extension portion 46, fourth back plate back extension portion 48, fifth back plate back extension portion 50, sixth back plate back extension portion 52, seventh back plate back extension portion 54 and eighth back plate back extension portion 56.

First back plate back extension portion 42 is mechanically coupled to first back plate back extension portion tube 86 that encloses a first back plate back extension portion cylinder. Second back plate back extension portion 44 is mechanically coupled to second back plate back extension portion tube 82 that encloses a second back plate back extension portion cylinder. Third back plate back extension portion 46 is mechanically coupled to third back plate back extension portion tube 80 which encloses a third back plate back extension portion cylinder. Fourth back plate back extension portion 48 is mechanically coupled to fourth back plate back extension portion tube 76 which encloses a fourth back plate back extension portion cylinder. Fifth back plate back extension portion 50 is mechanically coupled to fifth back plate back extension portion tube 74 which encloses a fifth back plate back extension portion cylinder. Sixth back plate back extension portion 52 is mechanically coupled to sixth back plate back extension portion tube 68 which is further mechanically coupled to a sixth back plate back extension portion cylinder. Seventh back plate back extension portion 54 is mechanically coupled to seventh back plate back extension portion tube 40 which further encloses seventh back plate back extension portion cylinder 65. Eighth back plate back extension portion 56 is mechanically coupled to eighth back plate back extension portion tube 60 which further encloses eighth back plate back extension portion tube 61.

First back plate hinge assembly 88 is formed by inserting first back plate hinge rod 96 through the first back plate back extension portion cylinder, the first tail gate attachment plate extension portion cylinder and the second back plate back extension portion cylinder. Second back plate hinge assembly 98 is formed by inserting second back plate hinge rod 94 through the third back plate back extension portion cylinder, the second tail gate attachment plate extension portion cylinder and the fourth back plate back extension portion cylinder. Third back plate hinge assembly 100 is formed by inserting third back plate hinge rod 92 through the fifth back plate back extension portion cylinder, the third tail gate attachment plate extension portion cylinder and the sixth back plate back extension portion cylinder. Fourth back plate hinge assembly 118 is formed by inserting fourth back plate hinge rod 90 through the seventh back plate back extension portion cylinder, the fourth tail gate attachment plate extension portion cylinder and the eighth back plate back extension portion cylinder.

Back plate 40 further comprises first back plate right extension portion 104, second back plate right extension portion 106, first back plate left extension portion 108 and fourth back plate left extension portion 110. First back plate right extension portion 104 is mechanically coupled to first back plate right extension portion tube 112, which further surrounds a first back plate right extension portion cylinder. Second back plate right extension portion 106 is mechanically coupled to second back plate right extension portion tube 116, which further surrounds a second back plate right extension portion cylinder. First back plate left extension portion 108 is mechanically coupled to first back plate left extension portion tube 122, which further surrounds a first back plate left extension portion cylinder. Second back plate left extension portion 110 is mechanically coupled to second back plate left extension portion tube 126, which further surrounds a second back plate left extension portion cylinder.

Right plate 130 further comprises first right plate extension portion 132, second right plate extension portion 133, third right plate extension portion 134 and fourth right plate extension portion 136. First right plate extension portion 132 is mechanically coupled to first right plate extension portion tube 138 which further surrounds a first right plate extension portion cylinder. Second right plate extension portion 133 is mechanically coupled to second right plate extension portion tube 142 which further surrounds a second right plate extension portion cylinder. Third right plate extension portion 134 is mechanically coupled to third right plate extension portion tube 146 which further surrounds a third right plate extension portion cylinder. Fourth right plate extension portion 136 is mechanically coupled to fourth right plate extension portion tube 147 which further surrounds a fourth right plate extension portion cylinder.

Left plate 160 further comprises first left plate extension portion 164, second left plate extension portion 166, third left plate extension portion 168 and fourth left plate extension portion 170. First left plate extension portion 164 is mechanically coupled to first left plate extension portion tube 172 which further surrounds a first left plate extension portion cylinder. Second left plate extension portion 164 is mechanically coupled to second left plate extension portion tube 174 which further surrounds a second left plate extension portion cylinder. Third left plate extension portion 166 is mechanically coupled to third left plate extension portion tube 178 which further surrounds a third left plate extension portion cylinder. Fourth left plate extension portion 170 is mechanically coupled to fourth left plate extension portion tube 180 which further surrounds a fourth left plate extension portion cylinder.

First right plate hinge assembly 152 is formed by inserting first right plate hinge rod 154 through the first right plate extension portion cylinder, first back plate right extension portion cylinder and second right plate extension portion cylinder. Second right plate hinge assembly 158 is formed by inserting second right plate hinge rod 156 through the third right plate extension portion cylinder, the second back plate right extension portion cylinder and the fourth right plate extension portion cylinder.

First left plate hinge assembly 182 is formed by inserting first left plate hinge rod 164 through first left plate extension portion cylinder 121, first back plate left extension portion cylinder 123 and second left plate extension portion cylinder 151. Second left plate hinge assembly 186 is formed by inserting second left plate hinge rod 156 through the third left plate extension portion cylinder, the second back plate left extension portion cylinder and the fourth left plate extension portion cylinder.

Right plate 130 is mechanically coupled to right plate bracket 190. Right plate bracket 190 further comprises right clip 194 which is configured to slide over right striker post S to prevent right plate 130 from separating from right striker post S.

Left plate 160 is mechanically coupled to left plate bracket 196. Left plate bracket 196 further comprises left clip 200 which is configured to slide over left striker post S to prevent left plate 160 from separating from left striker post S.

As used in this application a "tube" is a structure that has two open ends. A tube need not be cylindrical and it can be any shape. The drawings, for instance, show the tubes listed above as being parallelepiped.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A truck bed extension configured to connect to a right striker post and a left striker post on a truck having a tail gate; the truck bed extension, comprising: a tail gate attachment plate, mechanically coupled to the tail gate;
   a back plate, rotationally connected to the tail gate attachment plate with a first back plate hinge assembly, a second back plate hinge assembly, a third back plate hinge assembly and a fourth back plate hinge assembly;
   a right plate, rotationally connected to the back plate with a first right plate hinge assembly and a second right plate hinge assembly;
   a left plate, rotationally connected to the back plate with a first left plate hinge assembly and a second left plate hinge assembly;

a right plate bracket, attached to the right plate and configured to receive the right striker post; and
a left plate bracket, attached to the left plate and configured to receive the left striker post the tail gate attachment plate further comprises: a first tail gate attachment plate extension portion, a second tail gate attachment plate extension portion, a third tail gate attachment plate extension portion and a fourth tail gate attachment plate extension portion;
the back plate further comprises: a first back plate back extension portion, a second back plate back extension portion, a third back plate back extension portion, a fourth back plate back extension portion, a fifth back plate back extension portion, a sixth back plate back extension portion, a seventh back plate back extension portion and an eighth back plate back extension portion;
the first back plate hinge assembly further comprising:
a first back plate back extension portion cylinder, which is enclosed by a first back plate back extension portion tube attached to the first back plate back extension portion;
a second back plate back extension portion cylinder, which is enclosed by a second back plate back extension portion tube attached to the second back plate back extension portion;
a first tail gate attachment plate extension portion cylinder, which is enclosed by a first tail gate attachment plate extension portion tube attached to a first tail gate attachment plate;
a first back plate hinge rod inserted through the first back plate back extension portion cylinder, the second back plate back extension portion cylinder and the first tail gate attachment plate extension portion cylinder;
the second back plate hinge assembly further comprising:
a third back plate back extension portion cylinder, which is enclosed by a third back plate back extension portion tube attached to the third back plate back extension portion;
a fourth back plate back extension portion cylinder, which is enclosed by a fourth back plate back extension portion tube attached to the fourth back plate back extension portion;
a second tail gate attachment plate extension portion cylinder, which is enclosed by a second tail gate attachment plate extension portion tube attached to a second tail gate attachment plate;
a second back plate hinge rod inserted through the third back plate back extension portion cylinder, the second tail gate attachment plate extension portion cylinder and the fourth back plate back extension portion cylinder;
the third back plate hinge assembly further comprising:
a fifth back plate back extension portion cylinder, which is enclosed by a fifth back plate back extension portion tube attached to the fifth back plate back extension portion;
a sixth back plate back extension portion cylinder, which is enclosed by a sixth back plate back extension portion tube attached to the sixth back plate back extension portion;
a third tail gate attachment plate extension portion cylinder, which is enclosed by a third tail gate attachment plate extension portion tube attached to a third tail gate attachment plate;
a third back plate hinge rod inserted through the fifth back plate back extension portion cylinder, the third tail gate attachment plate extension portion cylinder and the sixth back plate back extension portion cylinder;
the fourth back plate hinge assembly further comprising:
a seventh back plate back extension portion cylinder, which is enclosed by a seventh back plate back extension portion tube attached to the seventh back plate back extension portion;
an eighth sixth back plate back extension portion cylinder, which is enclosed by an eighth back plate back extension portion tube attached to the eighth back plate back extension portion;
a fourth tail gate attachment plate extension portion cylinder, which is enclosed by a fourth tail gate attachment plate extension portion tube attached to a fourth tail gate attachment plate; and
a fourth back plate hinge rod inserted through the seventh back plate back extension portion cylinder, the fourth tail gate attachment plate extension portion cylinder and the eighth back plate back extension portion cylinder.

2. The truck bed extension of claim 1,
the right plate further comprises a first right plate extension portion, a second right plate extension portion, a third right plate extension portion and a fourth right plate extension portion;
the back plate further comprises a first back plate right extension portion and second back plate right extension portion;
the first right plate hinge assembly further comprises:
a first right plate extension portion cylinder, which is enclosed by a first right plate extension portion tube attached to the first right plate extension portion;
a first back plate right extension portion cylinder, which is enclosed by a first back plate right extension portion tube attached to the first back plate right extension portion;
a second right plate extension portion cylinder, which is enclosed by a second right plate extension portion tube attached to the second right plate extension portion;
a first right plate hinge rod inserted through the first right plate extension portion cylinder, the first back plate right extension portion cylinder and the second right plate extension portion cylinder;
the second right plate hinge assembly further comprises:
a third right plate extension portion cylinder, which is enclosed by a third right plate extension portion tube attached to the third right plate extension portion;
a second back plate right extension portion cylinder, which is enclosed by a second back plate right extension portion tube attached to the second back plate right extension portion;
a fourth right plate extension portion cylinder, which is enclosed by a fourth right plate extension portion tube attached to the fourth right plate extension portion; and
a second right plate hinge rod inserted through the third right plate extension portion cylinder, the second back plate right extension portion cylinder and the fourth right plate extension portion cylinder.

3. The truck bed extension of claim 2,
the left plate further comprises a first left plate extension portion, a second left plate extension portion, a third left plate extension portion and a fourth left plate extension portion;
the back plate further comprises a first back plate left extension portion and second back plate left extension portion;
the first left plate hinge assembly further comprises:
a first left plate extension portion cylinder, which is enclosed by a first left plate extension portion tube attached to the first left plate extension portion;

a first back plate left extension portion cylinder, which is enclosed by a first back plate left extension portion tube attached to the first back plate left extension portion;

a second left plate extension portion cylinder, which is enclosed by a second left plate extension portion tube attached to the second left plate extension portion;

a first left plate hinge rod inserted through the first left plate extension portion cylinder, the first back plate left extension portion cylinder and the second left plate extension portion cylinder;

the second left plate hinge assembly further comprises:

a third left plate extension portion cylinder, which is enclosed by a third left plate extension portion tube attached to the third left plate extension portion;

a second back plate left extension portion cylinder, which is enclosed by a second back plate left extension portion tube attached to the second back plate left extension portion;

a fourth left plate extension portion cylinder, which is enclosed by a fourth left plate extension portion tube attached to the fourth left plate extension portion; and a second left plate hinge rod inserted through the third left plate extension portion cylinder, the second back plate left extension portion cylinder and the fourth left plate extension portion cylinder.

* * * * *